United States Patent Office
2,938,036
Patented May 24, 1960

2,938,036

CYANO-ETHANOLPYRIDINES

Francis E. Cislak, Indianapolis, Ind., assignor to Reilly Tar & Chemical Corporation, Indianapolis, Ind., a corporation of Indiana No Drawing. Filed July 20, 1959, Ser. No. 828,033

7 Claims. (Cl. 260—294.9)

This invention relates to new chemical compounds and to the process of making them. More particularly, it relates to cyano-ethanolpyridines having the following structural formulae:

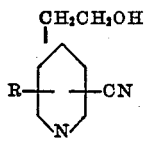

and

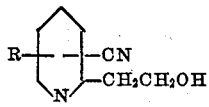

where R is hydrogen or lower alkyl.

In general, the compounds of my invention may be prepared by the condensation of formaldehyde with a cyanopyridine having a methyl group attached at the 2- or the 4-position of the pyridine ring. The equation below portrays the formation of 5-cyano-2-ethanolpyridine from 2-methyl-5-cyanopyridine:

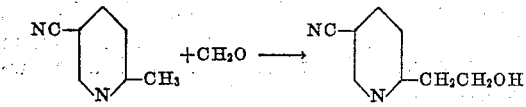

My cyano-ethanolpyridines are useful in the preparation of cyano-vinylpyridines which latter compounds are described and claimed in my co-pending application Serial Number 781,830, filed December 22, 1958. My cyano-ethanolpyridines may be used in the preparation of aminomethylethanolpyridines:

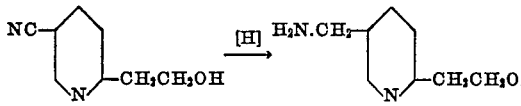

And they may be hydrolysed, as with dilute caustic soda, to give ethanolpyridine carboxylic acids or amides:

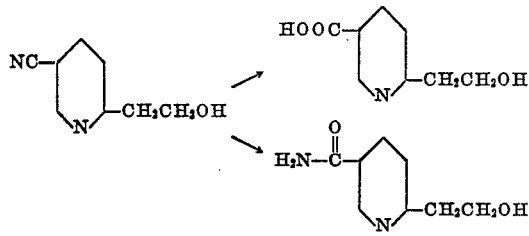

The ethanolpyridine carboxylic acids are useful in the preparation of vinylpyridine carboxylic acids.

Oxidation, with nitric acid, converts my cyano-ethanolpyridines to cyanopyridine carboxylic acids:

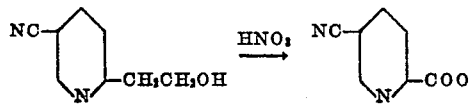

Some of my cyano-ethanolpyridines may also be prepared by reacting a quaternary salt of the N-oxide of an ethanolpyridine with KCN. The equation below portrays the formation of 2-cyano-3-ethanolpyridine from 3-ethanolpyridine-N-oxide:

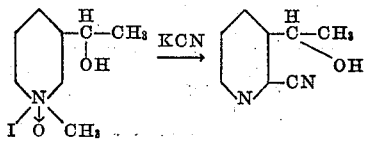

The above process of making cyano-ethanolpyridines, as well as other cyano-alkanolpyridines, is the subject of my copending application Serial No. 845,634, filed October 12, 1959.

My invention will be described more fully in conjunction with the following specific examples. It should be understood, however, that these examples are given by way of illustration only, and that my invention is not to be limited by the details set forth therein.

EXAMPLE 1

5-cyano-2-ethanolpyridine

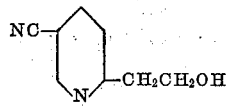

A mixture of 1,200 grams of 2-methyl-5-cyanopyridine and 35 grams of para-formaldehyde is placed into a stainless steel pressure vessel provided with means for heating and agitating. The vessel is closed, heated to about 70° C.; the agitation is now started. While continuing the agitation, the temperature of the vessel is raised to about 140° C. at which temperature it is held for from about 15 minutes to about one hour. Then the vessel is cooled to about 30° C., and the contents poured into a distillation flask. The excess 2-methyl-5-cyanopyridine is removed by distillation under vacuum. The residue remaining after the 2-methyl-5-cyanopyridine is distilled off is a semi-refined 5-cyano-2-ethanolpyridine. It is useful as is for the preparation of 2-vinyl-5-cyanopyridine. If a purer 5-cyano-2-ethanolpyridine is desired, the residue is subjected to high vacuum distillation. The distillate is about 95–98% pure 5-cyano-2-ethanolpyridine. It boils above about 140° C. at 15 mm. Hg pressure.

EXAMPLE 2

4-cyano-2-ethanolpyridine

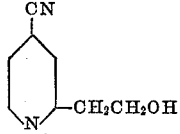

The procedure of Example 1 is repeated except that 2-methyl-4-cyanopyridine is used in place of the 2-methyl-5-cyanopyridine.

EXAMPLE 3

2-ethanol-4-cyanopyridine and 2-ethanol-6-cyanopyridine

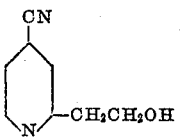

and

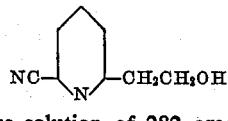

To an aqueous solution of 282 grams of the methyl iodide quaternary salt of 2-ethan-2-olpyridine-N-oxide there is added 70 grams of KCN. The mixture is stirred, at room temperature, for about four hours. The solution is then extracted with chloroform, and the 2-ethanol-4-cyanopyridine and the 2-ethanol-6-cyanopyridine are recovered from the chloroform extract by fractional distillation under high vacuum. The 2-ethanol-6-cyanopyridine isomer predominates.

EXAMPLE 4

*2-ethanol-3-cyanopyridine*

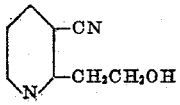

The procedure of Example 1 is repeated with the exception that 2-methyl-3-cyanopyridine is used in place of the 2-methyl-5-cyanopyridine.

EXAMPLE 5

*4-ethanol-2-cyanopyridine*

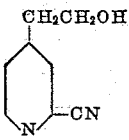

The procedure of Example 1 is repeated with the exception that 2-cyano-4-methylpyridine is used in place of the 2-methyl-5-cyanopyridine.

I claim as my invention:

1. A compound of the class consisting of 2-ethanol-cyanopyridines and 4-ethanol-cyanopyridines having the structural formulae:

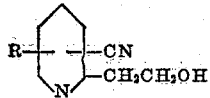

and

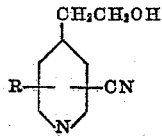

where R is selected from the group consisting of hydrogen and lower alkyl.

2. 2-ethanol-3-cyanopyridine.
3. 2-ethanol-4-cyanopyridine.
4. 4-ethanol-2-cyanopyridine.
5. 2-ethanol-5-cyanopyridine.
6. 2-ethanol-6-cyanopyridine.

7. The process of making compounds of the class consisting of 2-ethanol-cyanopyridines and 4-ethanol-cyanopyridines having the structural formulae:

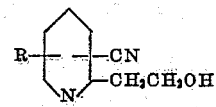

and

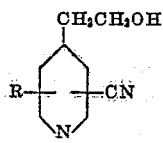

where R is selected from the group consisting of hydrogen and lower alkyl which comprises preparing a mixture of formaldehyde with a compound of the class consisting of 2-methyl-cyanopyridine and 4-methyl-cyanopyridine which compounds have the structural formulae:

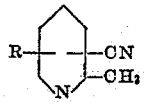

and

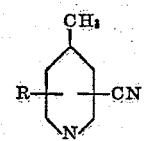

where R is selected from the group consisting of hydrogen and lower alkyl, heating the resultant mixture to a temperature of about 140° for from about 15 minutes to about one hour, and recovering the resultant cyanoethanolpyridine.

No references cited.